Patented Apr. 10, 1934

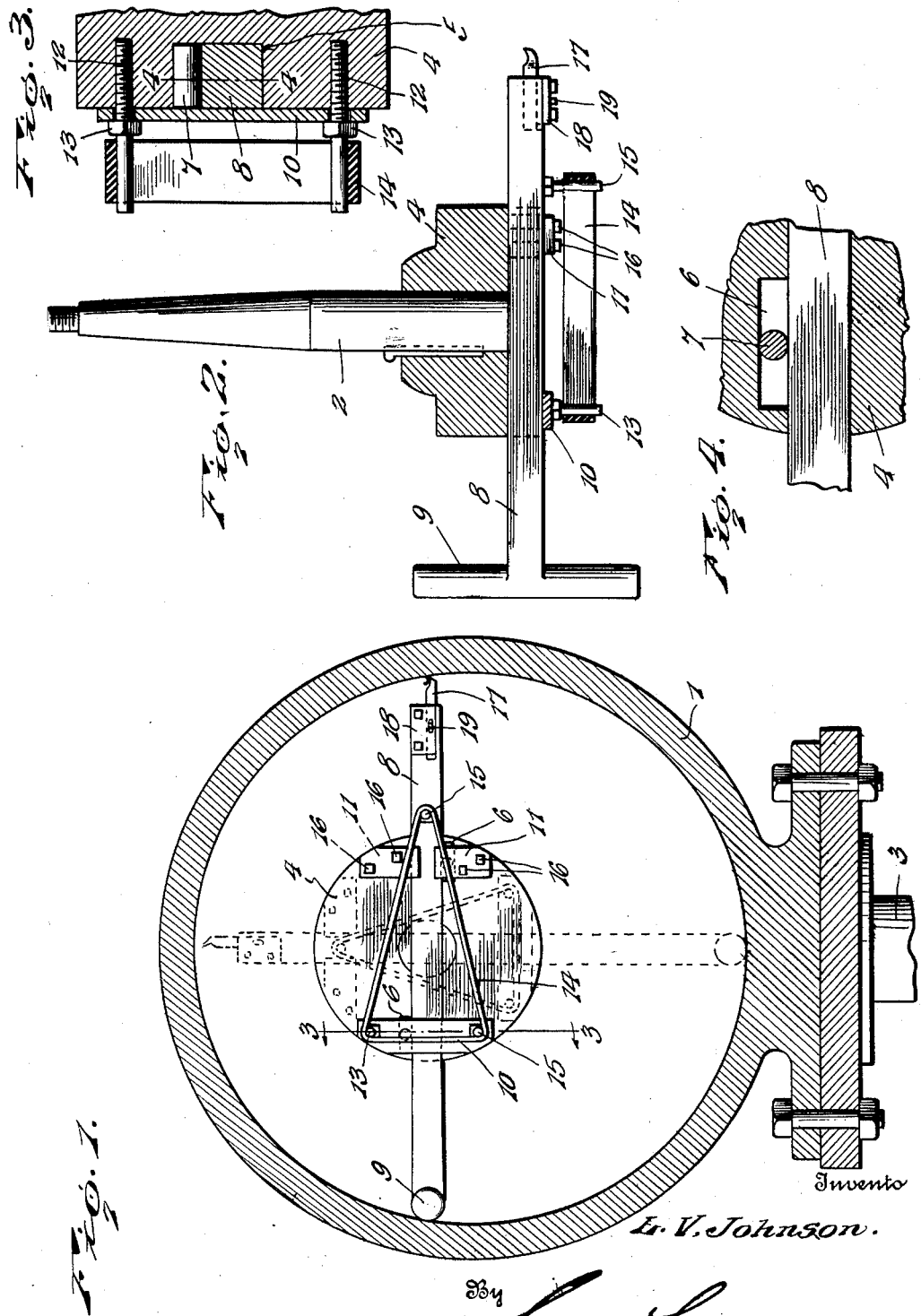

1,954,385

UNITED STATES PATENT OFFICE 1,954,385

TOOL FOR BORING CYLINDERS

Louis V. Johnson, Houston, Tex., assignor of twenty-five per cent to Luella C. Johnson, five and five-ninths per cent to James E. Snow, seven and one-half per cent to James A. Kluever, and thirty-six and seventeen-eighteenths per cent to Alfred John Shudde, all of Houston, Tex.

Application March 18, 1932, Serial No. 599,800

1 Claim. (Cl. 77—61)

This invention relates to means for boring the cylinders of rotary pumps and engines and seeks particularly to provide an improved means for boring cylinders which are not of true circular form but at points between opposite ends of one diameter are slightly eccentric to the axis of the cylinder so that the cross sectional contour of the bore of the cylinder is slightly oblate. The present invention provides a boring tool which will be rotated within the cylinder and which, although in constant contact with the wall of the cylinder, will not cut into the same at two diametrically opposite points. The invention further provides novel means for maintaining the proper contact between the bit and the wall of the cylinder and holding the bit steady during its travels. The invention is illustrated in the accompanying drawing and will be hereinafter fully described and particularly defined.

In the drawing, Figure 1 is a transverse section of a cylinder showing the improved boring tool mounted therein, Fig. 2 is a horizontal section of the spindle head with the boring tool in elevation, Fig. 3 is an enlarged detail section on the line 3—3 of Fig. 1, Fig. 4 is an enlarged detail section on the line 4—4 of Fig. 3.

The engine or pump cylinder is indicated by the numeral 1 and in boring the cylinder by the use of my improved tool, the cylinder is mounted concentric with a lathe spindle 2 and is supported upon a vertically movable standard, indicated at 3, or in any other convenient manner. A head 4 is keyed to the end of the lathe spindle 2 and the spindle is rotated in the usual manner so as to rotate the bit in engagement with the work. The head 4 is provided with a diametrical groove 5 across its face and in the opposite walls of this groove, at opposite ends thereof, are formed recesses or seats 6 which receive loose rollers 7, as shown. A bar or shank 8 is mounted slidably in the groove 5 and bears against the rollers 7 so that while the bar will be guided in a rectilinear path it may move easily at all times without excessive frictional resistance and wear. One end of the bar 8 is provided with a foot 9 which is disposed at a right angle to the bar or shank and the latter is of a non-circular cross section, as shown clearly in Fig. 3, so that it will be prevented from turning in the groove 5 during its reciprocation. The bar or shank 8 is held in the groove 5 by a keeper plate 10 secured upon the face of the head 4, adjacent one end of the groove 5, and, adjacent the other end of the groove 5, clamps 11 are secured upon the head and have their opposed ends overlapping the sides of the shank, as clearly shown in Fig. 1. The keeper plate 10 is provided with openings adjacent its ends through which threaded studs or cap screws 12 are inserted into the head so as to be firmly seated therein, and nuts 13 are mounted on the studs to be turned home against the keeper plate and thereby firmly secure the plate in position. The studs project beyond the nuts 13 and their outer portions are unthreaded so that they will present smooth surfaces to the contractile band 14 which is fitted about them and about a pin or stud 15 which is secured upon the shank at a point adjacent the end remote from the foot 9. The clamps or keeper plates 11 are secured to head 4 by bolts or cap screws 16, as will be understood. A cutter or bit 17 is seated in a socket provided therefor in the end of the shank 8 and is retained in said socket by a keeper plate 18 secured to the side of the shank and projecting over the bit, as shown most clearly in Fig. 1.

As previously stated, the cylinder to be bored is mounted concentric with the lathe spindle 2 while the boring tool is being placed in position. The tool is then turned to the vertical position shown in Fig. 1 so that it will follow the vertical diameter of the cylinder and in this position the bit or cutter is adjusted so that it will touch the wall of the cylinder while the foot 9 bears against said wall at a diametrically opposite point. The bit is then secured in the proper position and the cylinder then lowered relative to the lathe spindle a distance corresponding to the greatest depth of the cut which is to be made, the band 14, which is of some elastic material and may very conveniently be a heavy rubber band, causing the bit to slide downwardly in the groove 5 in an obvious manner. It may be noted particularly at this point that the retracting elastic band 14, when in position, assumes a triangular form as it passes around the studs 13 at opposite sides of the shank and the stud 15 on the shank and inasmuch as the studs 13 are fixed in the head 4 which is secured to the lathe spindle, the strength of the band will be exerted to draw the shank constantly in the direction of the foot 9 and hold said foot in contact with the wall of the cylinder. The lathe spindle is then rotated and the cutter will, of course, be carried around with the spindle, but it will rotate upon an axis eccentric to the axis of the cylinder and consequently at two diametrically opposite points it will cut into the wall of the cylinder and will shave a portion of the material of the cylinder therefrom. After the cutter has traveled through the length of the cylinder, the bit is adjusted slightly outwardly in its socket and the operation is repeated, a slight additional cutting away of the surface of the wall being effected. This operation is repeated until the desired boring of the cylinder has been effected. The bit 17 is held in its adjusted position by a set screw 19 or some equivalent thereof, as will be understood.

The tool of the present invention is very simple and may be produced at a very slight cost and will be found highly efficient in operation. The retractile band 14 serves to maintain the proper engagement between the foot 9 and the wall of the cylinder so that the bit will be automatically withdrawn as it approaches points concentric with the axis of rotation and will cut into the wall as it approaches points which are eccentric to the axis of rotation.

Having thus described the invention, I claim,

A boring tool comprising a rotatable head having a diametrical groove in its face, a shank slidably fitted in said groove, a foot at one end of the shank, a bit carried by the opposite end of the shank, a keeper plate on the head retaining the shank in the groove therein, a pair of studs each having its inner end threaded and extended through the keeper plate and engaging the head and its outer end projecting laterally beyond the keeper plate and provided with a smooth bearing surface, nuts engaging the threaded portions of the studs and bearing against the keeper plate, a single stud engaging the shank in advance of said pair of studs and provided with a smooth bearing surface, and a substantially triangular shaped elastic band extending over the smooth bearing surfaces of the pair of studs with its apex extending over the smooth bearing surface of the stud on the shank for exerting a direct uniform retractive force on the shank and holding the foot in constant engagement with the wall of a cylinder which is being bored.

LOUIS V. JOHNSON. [L. S.]